UNITED STATES PATENT OFFICE.

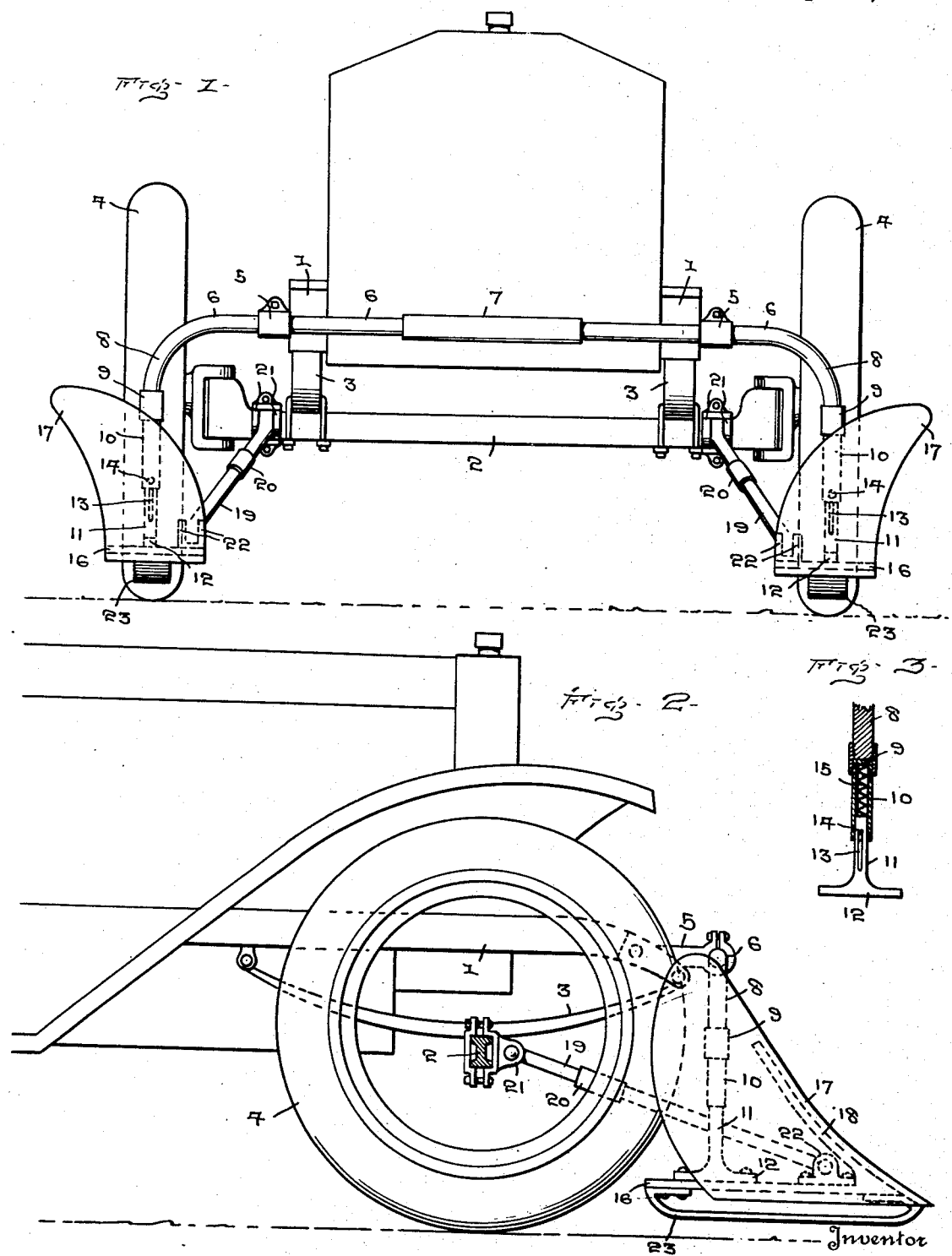

CLAUDE C. HYDE, OF OTISVILLE, NEW YORK.

SNOW-PLOW.

1,199,075.  Specification of Letters Patent.  Patented Sept. 26, 1916.

Application filed May 29, 1916. Serial No. 100,744.

*To all whom it may concern:*

Be it known that I, CLAUDE C. HYDE, a citizen of the United States, residing at Otisville, in the county of Orange and State of New York, have invented certain new and useful Improvements in Snow-Plows; and I do hereby declare the following to be a full, clear, and exact description of the invention, such as will enable others skilled in the art to which it appertains to make and use the same.

My invention relates to new and useful improvements in snow plows and more particularly to that class adapted to be used in connection with automobiles for removing snow from in front of the wheels of the automobile, and my object is to provide means for suspending a pair of plows forwardly of the path of the front wheels of the automobile.

A further object is to provide means for yieldingly supporting the plows from parts of the automobile.

A further object is to provide a guard for limiting the downward movement of the plows. And a further object is to provide base members for the plows.

Other objects and advantages will be hereinafter set forth and more particularly pointed out in the accompanying specification.

In the accompanying drawings which are made a part of this application, Figure 1 is a front elevation of an automobile showing the plows in operative position thereon. Fig. 2 is a side elevation thereof, and Fig. 3 is a detail sectional view through the supporting means for the plows.

Referring to the drawings in which similar reference numerals designate corresponding parts throughout the several views, 1 indicates the chassis of the vehicle which may be constructed in any preferred manner, 2 the forward axle of the vehicle, 3 the springs connecting said axle and chassis and 4 indicates the supporting wheels for the vehicle.

Suspended from the chassis 1, by means of brackets 5, is a bumper 6, which is preferably formed in two sections and having a coupling 7 in which are formed right and left hand threads and adapted to increase or decrease the length of the bumper, the outer ends of the bumper being provided with curved arms 8 which rest in a horizontal position under ordinary conditions and beyond the wheels 4, but when used as supports for the snow plows, they extend downwardly. The free ends of the curved arms are preferably threaded and engage couplings 9, the opposite ends of said couplings engaging hollow standards 10 in which are slidably mounted shanks 11 having feet 12 at their lower ends, said shanks having slots 13 therethrough through which project pins 14 carried by the standards 10, thus permitting vertical movement of said shanks with respect to the standards, a spring 15 being placed in each standard between the upper end of the standard and the upper end of the shank coöperating therewith.

The foot portions 12 are secured to frames 16, said frames having mold boards 17 attached thereto, said mold boards being so constructed that snow, or the like, encountering the same will be thrown to one side of the path of the plows and as said mold boards are directly in front of the forward wheels of the vehicle, a path will be made for said wheels. The forward ends of the frames 16 are provided with extensions 18 to which the inner edges of the mold boards are attached and said plows are securely braced and held against swinging movement by means of brace bars 19, said brace bars being preferably of two sections and secured together by means of couplings 20, said couplings having right and left hand threads by means of which the length of the brace bars may be increased or decreased. The ends of the brace bars are attached respectively between ears 21 and 22, the ears 22 being fixed to the frames 16, while the ears 21 are clamped on to the forward axle 2 of the vehicle, said brace bars holding the plows against rearward swinging movement but permitting the same to move upwardly a predetermined distance when a solid object is encountered by the plow.

In order to prevent the plows from coming in direct contact with the road surface over which the machine is traveling, each frame 16 is provided with a shoe 23, the ends of which are curved upwardly so as to give a runner effect to said shoe, and by constructing the shoes in this manner, any solid obstructions encountered will not break the plows, or parts carrying the same, as the runners will ride up over said obstructions and raise the plows above the same, and when the plows are moved upwardly the shanks 11 will telescope with the standards 10 and depress the springs 15 so that as soon as the shoes have been liberated from the solid objects the plows will be immediately lowered to their initial position.

If it is desired to temporarily dispense with the use of the snow plows, the sections of the brace bars may be separated from each other and the plows swung upwardly and out of the path of the wheels where they will remain until such time as it is again desired to use the plows when they may be swung to lowered position and the sections of the brace bars again secured together. It will likewise be seen that when there is no snow, the couplings 9 are disengaged from the ends of the bumper 6 and the ears 21 are released from the axle 2, thus entirely disconnecting the plows from the machine, and by extending the two sections of the bumper outwardly to their proper distance, by operating the couplings 7, and extending the curved arms 8 of the bumper in a horizontal position it will act the same as the bumper now in use.

It will thus be seen that this device can be attached to a vehicle without changing any of the parts thereof as the parts supporting and bracing the plows may be attached to the vehicle at any time, and it will likewise be seen that the means for supporting the plow may be used as a bumper when the plows are not in use. It will likewise be seen that by connecting the parts of the device together by means of the couplings, the various parts of the structure may be adjusted to different positions. And it will likewise be seen that by providing the yielding connection between the plows and parts supporting the same, said plows may be protected against breakage by coming in contact with solid bodies.

I claim:—

1. The combination with a motor propelled vehicle having wheels thereon, of a pair of plow structures, comprising mold boards, frames, carrying said mold boards, an adjustable bumper carried by the vehicle, means to adjustably and yieldingly attach said frames to the ends of the bumper, and adjustable brace bars between said frames and parts of the vehicle.

2. The combination with a motor propelled vehicle having wheels, of a pair of plow structures, comprising mold boards, frames carrying said mold boards, a bumper carried by the vehicle, hollow standards attached to said bumper, shanks attached to said frames and having their ends entered in the standards, yielding means between the shanks and upper ends of the standards, means to limit the longitudinal movement of the shank, and adjustable means extending between the frames and parts of the vehicle for bracing said frame.

3. The combination with a vehicle having a bumper thereon, and means to adjust the bumper longitudinally, of plow structures carried by the ends of said bumper, and means between the plow structures and vehicle for bracing the plow structures.

In testimony whereof I have signed my name to this specification in the presence of two subscribing witnesses.

CLAUDE C. HYDE.

Witnesses:
HENRY A. HOLLEY,
HORACE L. PATTERSON.